United States Patent [19]
Niehaus

[11] 3,904,960
[45] Sept. 9, 1975

[54] EXTENDABLE AND RETRACTABLE MOISTURE SENSING PROBE

[75] Inventor: William R. Niehaus, Cincinnati, Ohio

[73] Assignee: The E. W. Scripps Company, Cincinnati, Ohio

[22] Filed: July 12, 1974

[21] Appl. No.: 487,905

Related U.S. Application Data

[62] Division of Ser. No. 350,087, April 11, 1973, Pat. No. 3,841,205.

[52] U.S. Cl. ............ 324/65 P; 200/61.05; 324/72.5
[51] Int. Cl.² ........................................ G01R 27/02
[58] Field of Search...... 324/65 P, 72.5, 149, 158 P; 200/61.04, 61.05

[56] References Cited
UNITED STATES PATENTS

| | | | |
|---|---|---|---|
| 1,558,211 | 10/1925 | Williams | 324/72.5 X |
| 1,610,563 | 12/1926 | McIlvaine | 324/72.5 UX |
| 2,020,402 | 11/1935 | Edwards et al. | 324/72.5 UX |
| 2,515,004 | 7/1950 | Haupt | 324/72.5 UX |
| 2,954,521 | 9/1960 | McKee | 324/149 X |
| 3,045,176 | 7/1962 | Voltmann | 324/72.5 X |
| 3,196,217 | 7/1965 | Petrina | 324/72.5 X |
| 3,676,776 | 7/1972 | Bauer et al. | 324/72.5 |

OTHER PUBLICATIONS

Hallenback, Electrical Contacting Probe, IBM Technical Disclosure Bulletin, Oct. 1966, p. 453.

*Primary Examiner*—Stanley T. Krawczewicz
*Attorney, Agent, or Firm*—Meyer, Tilberry & Body

[57] ABSTRACT

A moisture detecting probe is disclosed which is adapted to engage the upper surface of a wetted article moving therepast. The probe is particularly useful in controlling the delivery of newspaper bundles in a newspaper room. The probe includes telescopically associated housing members and switch contact elements which close when the probe engages the upper surface of a newspaper bundle. The contact elements include a contact fixed to a contact rod in the housing by which the probe is reciprocated, and a spherical ball rollable on the upper surface of a newspaper bundle. The spherical ball is reciprocable relative to the fixed contact to close a circuit between the ball and fixed contact when the ball engages the bundle.

6 Claims, 3 Drawing Figures

EXTENDABLE AND RETRACTABLE MOISTURE SENSING PROBE

This is a division of application Ser. No. 350,087 filed Apr. 11, 1973, now Pat. No. 3,841,205 issued Oct. 15, 1974.

The present invention relates to the art of article sensors and, more particularly, to an extendable and retractable probe having fixed and movable contacts for detecting the presence or absence of an article in the path of movement of the probe.

The probe of the present invention finds particular utility in connection with the control of the delivery of bundles of newspapers in a newspaper room from a newspaper stacking device to any one of a number of discharge chutes leading to delivery trucks for the newspaper bundles. Accordingly, the invention will be described in detail in connection with such use.

As is well known in the newspaper industry, paper is printed, collated and folded to define a newspaper, and such newspapers are delivered to the mailroom of the newspaper plant for stacking, tying and delivery to trucks which carry the bundles to distribution points and the like. The stacking mechanism is controlled to provide a predetermined number of newspapers in a given stack, and each delivery truck is scheduled to receive a predetermined number of bundles each having a predetermined number of newspapers therein. The bundles are generally moved along a conveyor path from the stacking mechanism to a tying station at which the stacked newspapers are bound such as by wire, and thence along the conveyor path toward a plurality of discharge chutes leading to discharge stations at which delivery trucks are positioned. The delivery of a predetermined number of bundles to a given truck requires the operation of mechanisms at the chute locations which operate to deflect bundles from the conveyor into the chute. Moreover, appropriate mechanism must be provided for counting the number of bundles to be deflected to a given chute in order to be sure that the delivery truck receives the proper number of bundles.

Presently, such counting and distribution of newspaper bundles is performed either manually or by computer software. For example, counting has been achieved by electric-eye arrangements, and distribution of bundles by deflection to a given chute has been performed manually by an operator who opens or closes the deflector mechanism for the appropriate chute by remote control. Other systems for counting and distributing bundles have included marking the last bundle for each truck load as it leaves the stacker and detecting the last bundle downstream from the stack mechanism so as to provide a signal for the operator.

In the systems heretofore known, the counting and distribution methods have created certain problems which lead, for example, to the delivery of an improper number of bundles to a given truck. It will be appreciated that the number of newspapers printed is based on predetermined distribution numbers, and that the delivery of a given number of bundles to a given location is likewise predicated upon known factors concerning distribution at or from that location. Accordingly, it is extremely important that the proper number of bundles of newspapers be delivered to a given truck for delivery to a given destination. The systems employed heretofore, as mentioned above, employ an operator to remotely control the deflection of bundles from the conveyor to a given chute, whereby the delivery of bundles is subject to human error. The sitting and watching of conveyed bundles is at best a cumbersome job, and and instant of inattention on the part of the operator can cause an error not only in the delivery of bundles to a given truck but in subsequent deliveries to other waiting trucks. In this respect, one error can upset the entire schedule of counting and bundle delivery. Moreover, if the operator inadvertently actuates the wrong chute deflector, then the bundles scheduled for one truck are delivered to another truck. Such disruptions in the planned schedule of events in a newspaper mailroom cause confusion and time consuming delays which can result in considerable economic loss.

Electric-eye counting and control mechanisms have also been employed heretofore, and these systems are subject to interruption other than by a bundle moving past the electric-eye components. For example, employees in the mailroom of the newspaper plant may accidentally or purposely place an article between the transmitting and receiving components of the electric-eye system and thus place an error in count of bundles or the operation of mechanisms controlled by the electric-eye system. This, of course, disrupts the intended delivery operation and results in the delivery of an improper number of bundles to a given truck or the delivery of a given number of bundles to the wrong truck.

Accordingly, it is desired to provide a system for detecting newspaper bundles including a detecting component and which avoids disruption of the counting and delivery operation by intentional or unintentional acts of employees in the mailroom. A probe for such a system and by which the foregoing desired end results are achieved is provided in accordance with the present invention.

The probe of the present invention advantageously provides for the first and last bundles in a given number of marked bundles to be detected so as to control the actuation of mechanism by which the given number of bundles is deflected from the conveyor path to a chute leading to a given delivery truck or the like.

In accordance with the present invention, detecting probes are disposed above the conveyor path and are vertically extendable and retractable into and out of engagement with a bundle therebeneath. More particularly, the probes are actuable to an extended disposition upon a control signal, and when the probes engage a bundle therebeneath a control signal is produced. The probes then retract into the support housing therefore. Accordingly, it will be appreciated that the probes are not subject to being tampered with in a manner which will disrupt the counting sequence. Further, the probes each include a normally open switch contact assembly which closes when and only when a bundle is engaged. Thus, the probes provides efficient means for detecting and for counting the bundles to assure delivery of the proper number of bundles to a given chute without the assistance of chute operating personnel or the likelihood of a miscount due to intentional or unintentional action on the part of an employee.

An object of the present invention is the provision of an article detecting probe which enables articles to be detected and counted as they move along a conveyor path and which probe is operated automatically and is free from interference in operation by conditions external to the article handling apparatus.

Still another object is the provision of a probe of the foregoing character which is reciprocable relative to an article to be sensed to provide for the sensing of articles of varying height relative to the conveyor on which they are disposed.

Still a further object is the provision of a probe of the foregoing character which is extended in response to a control signal to engage an article and which includes contact means closed in response to engagement with the article to produce a signal operable to cause retraction of the probe to its initial position.

The foregoing objects, and others, will in part be obvious and in part more fully pointed out hereinafter in conjunction with the description of the accompanying drawing illustrating preferred embodiments of the present invention and in which.

Figure 1:
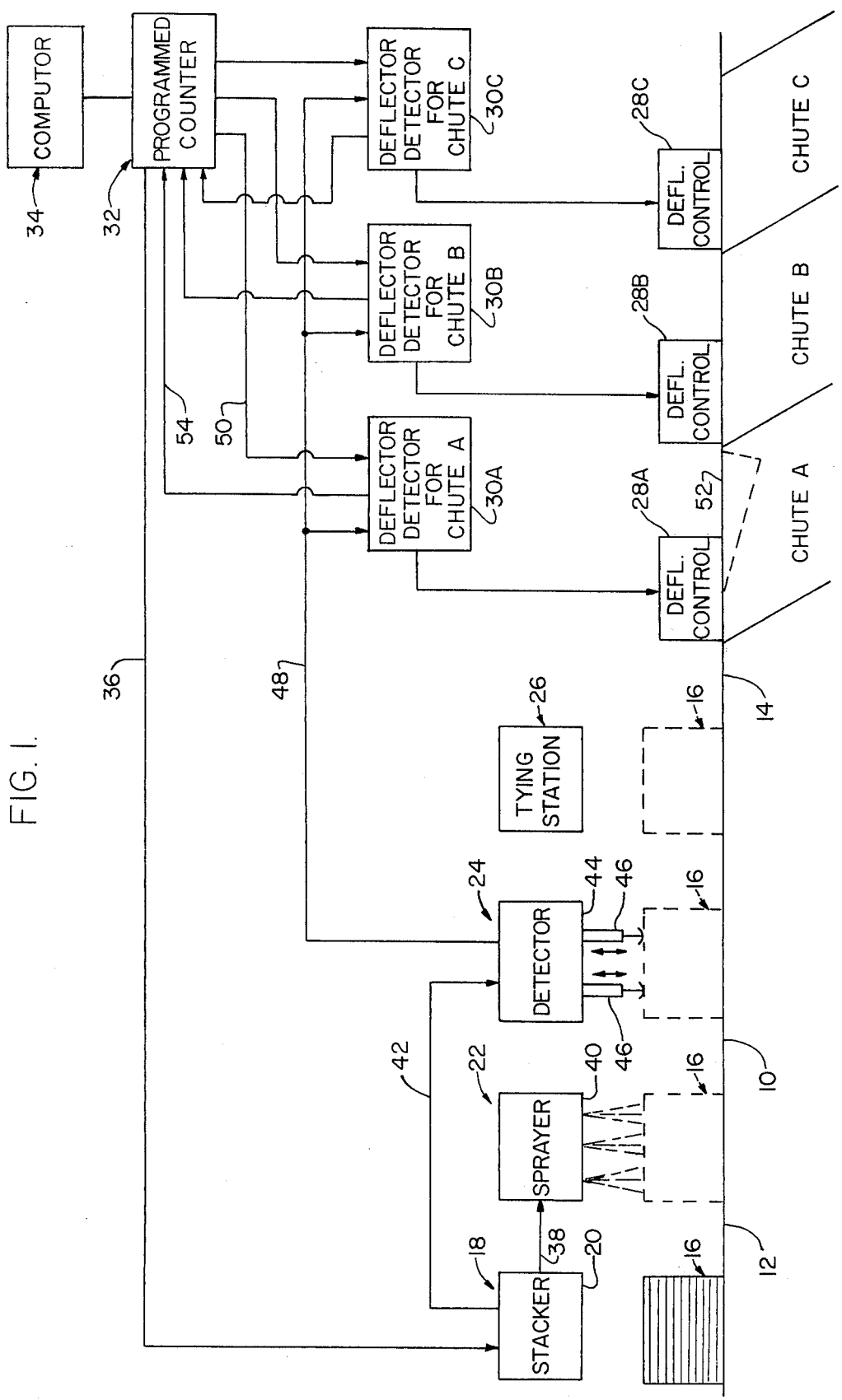
FIG. 1 is a schematic illustration of a newspaper bundle handling system including a probe in accordance with the present invention.

Referring now in greater detail to the drawings wherein the showings are for the purpose of illustrating preferred embodiments of the present invention only and not for the purpose of limiting the same, the components of a newspaper handling system including the probe of the present invention are illustrated schematically in FIG. 1. More particularly, line 10 represents the upper surface of a conveyor along which articles are moved progressively from an input end 12 towards an output end 14. In the embodiment illustrated, the articles being conveyed are bundles of newspapers designated generally by the numeral 16. Each bundle 16 is formed at a stacking station 18 by a stacker mechanism 20 and in a manner well known in the newspaper industry. Each bundle is then moved along the path of conveyor 10, successively past a spraying station 22, a detecting station 24 and a tying station 26. Each bundle then proceeds along the conveyor path towards a plurality of discharge chutes, three of which are illustrated in the present embodiment and designated chute A, chute B and chute C. A predetermined number of bundles 16 is deflected from conveyor 10 into a selected one of the three chutes as described more fully hereinafter. The chutes lead to delivery truck locations, whereby the bundles deflected into a given chute are delivered to a given truck.

The system further includes deflector control mechanisms 28A, 28B and 28C for chutes A, B and C, respectively, and deflector detector control components 30A, 30B and 30C for the corresponding chute. A counter mechanism 32 is programmed to control the system operation. Counter mechanism 32 can be programmed in any desired manner such as by feedout of information from a computer 34 associated therewith. The details concerning the computer and programmable counter mechanism are not pertinent to the present invention and, accordingly, will not be described in detail. The computer is adapted to feed information to counter 32 with respect to the total number of bundles to be displaced from the conveyor path to one of the chutes and the particular chute into which the bundles are to be deflected. This information, of course, corresponds with the number of bundles to be delivered to a given delivey truck and the location of the given truck with respect to the three available discharge chutes. Computers for this purpose are well known, and a suitable computer for the system being described will be readily suggested to those skilled in the art. Counter mechanism 32, for the purpose set forth more fully hereinafter, is adapted to produce an output signal to control the marking of the first and last bundles in a given number of bundles to be deflected from the conveyor path, and to provide an output signal to the appropriate one of the deflector detectors 30A, 30B and 30C so that the corresponding deflector control mechanism is actuated, at the proper time, to insure displacement of the number of bundles into the corresponding chute.

Operation of the system is initiated upon a command from the computer to the counter indicating, for example, that 25 bundles of newspaper are to be delivered along the conveyor path and deflected into chute A. Counter 32 then provides an output signal through line 36 to stacker mechanism 20 and an output signal through line 50 to deflector detector 30A. The signal through line 36 to stacker mechanism 20 initiates movement of a stack 16 at the stacking station along conveyor 10 to spraying station 22. Stacker mechanism 20 includes appropriate control circuitry to deliver the starting signal from the counter through line 38 to the spray mechanism 40 at spraying station 22. Spray mechanism 40 is actuated by the signal to spray a conductive liquid such as water onto the upper surface of the first bundle 16 of the 25 to be delivered to chute A. Stacker mechanism 20 in the meantime is preparing a second stack of newspapers.

The first bundle and the succeeding bundles are moved along the conveyor at a predetermined feed rate from the stacker to the sprayer and thence successively to the detecting station, to the tying station where appropriate mechanism operates to bind the stack of newspapers such as with wire, and thence toward the discharge chute locations.

The stacker mechanism includes appropriate means, not illustrated, to send a control signal through line 42 to detector mechanism 44 at detecting station 24 each time a bundle leaves the stacker mechanism. The latter signal from the stacker mechanism for a given bundle controls actuation of the detector mechanism for the latter to detect the presence of the given bundle when the latter reaches station 24.

The detector mechanism includes a pair of probes 46 the structure and operation of which is described in greater detail hereinafter. Each probe 46 is extendable and retractable and is normally retracted relative to the detector mechanism 44. In response to the control signal through line 42 the probes are extended when the bundle reaches station 24 to engage the upper surface of the bundle. In response to engaging a bundle 16, the detector mechanism transmits a control signal through line 48 to the appropriate deflector detector, which in the embodiment being described is deflector detector 30A for chute A.

Counter 32 is programmed by the information from the computer to actuate the proper deflector detector and accordingly, as mentioned above, feeds a signal through line 50 to deflector detector 30A so that the signal through line 48 from the detector mechanism 44 is introduced into deflector detector 30A. When the bundle 16 at the detecting station is the first bundle having the wetted upper surface, the signal delivered through line 48 to deflector detector 30A is, as pointed out more fully hereinafter, such that the latter operates to actuate deflector control mechanism 28A so that chute A is opened. In the schematic illustration of FIG. 1, chute A is illustrated as including a door 52 movable between the solid line position thereof and the dotted line position thereof representing the open condition of the chute. This illustration is for purpose of convenience of description only and it will be appreciated that the deflector mechanism may operate to deflect bundles to either side of the conveyor path as opposed to the downward displacement illustrated in FIG. 1.

When the bundle 16 at the detecting station is the second through 24th bundle, which latter bundles are not wetted, engagement of probes 46 with a bundle produces a null signal which is delivered through line 48 to deflector detector 30A. Accordingly, it will be appreciated that a signal is delivered through line 48 to deflector detector 30A each time a bundle is disposed at the detecting station. Deflector detector 30A in response to these signals sends a count signal through line 54 to count 32 which operates in a well known manner to progressively determine the number of bundles detected. UPon receipt of a signal indicating that 24 bundles have been counted, counter 32 again transmits a signal through line 36 through stacker mechanism 20 and line 38 to sprayer mechanism 40 so that the 25th and last bundle in the group is sprayed on the upper surface thereof with the conductive liquid.

When the 25th bundle reaches detecting station 24, probes 46 engages the upper surface thereof and a signal is sent through line 48 to deflector detector 30A and the latter responds to this signal to actuate deflector control mechanism 28A to close chute A when the 25th bundle has been deflected thereinto. The count signal for the 25th bundle is delivered through line 54 to counter 32 indicating completion of the delivery of the 25 bundles to chute A. Counter 32 then receives or has previously received information from computer 34 for the next scheduled delivery of a predetermined number of bundles to, for example, chute B. The programmed counter then provides an output signal to deflector detector 30B to ready the latter to energize deflector mechanism 28B, and provides an output signal through line 36 to stacker mechanism 20 to initiate the next sequence of bundle delivery. The system then functions as outlined above to deliver the second predetermined number of bundles to chute B. Chute A being closed enables the bundles to move therepast to chute B.

Figure 2:
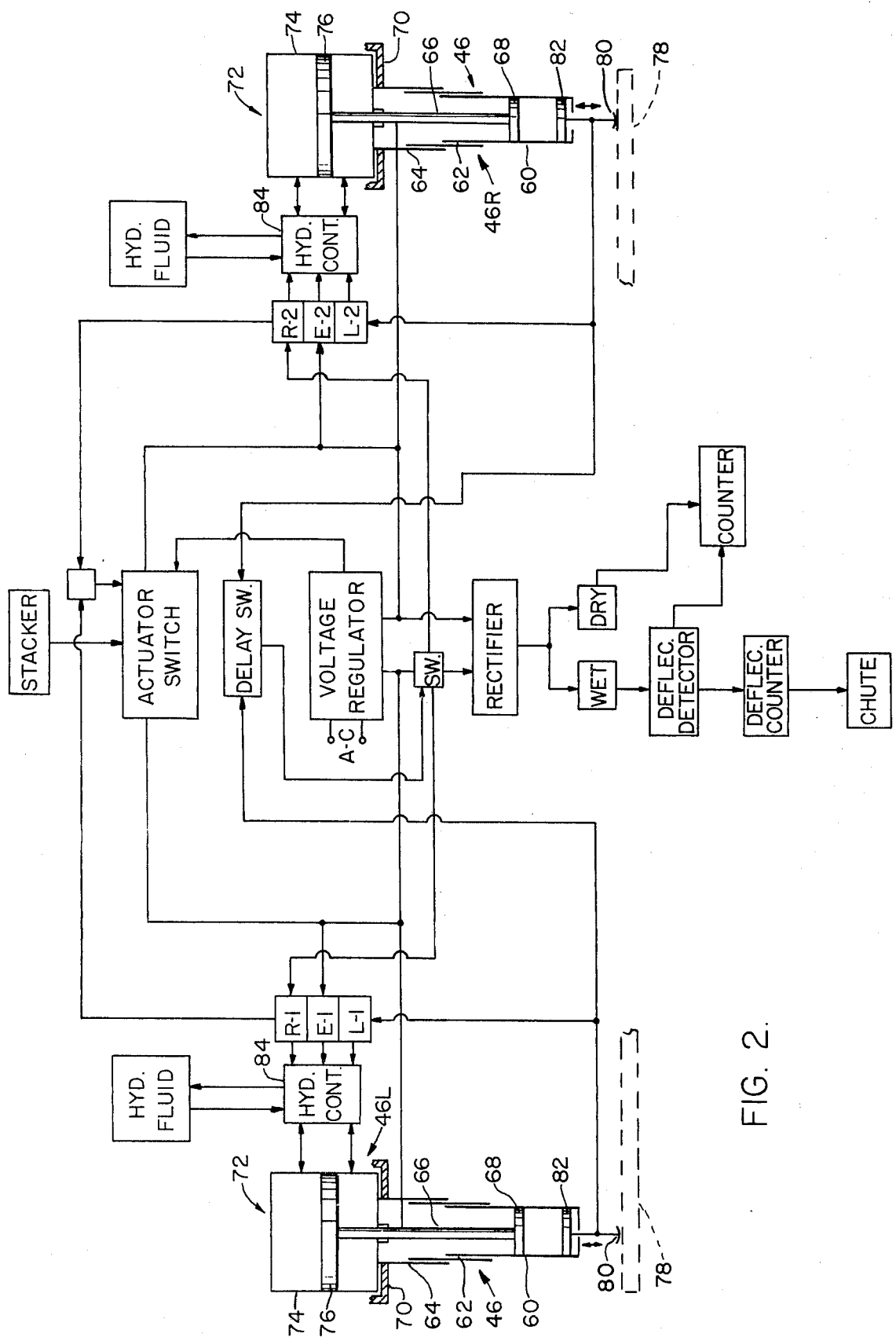
FIG. 2 is a schematic illustration of the probe portion of the control circuit in FIG. 1.

The mechanical operation of the probes at the detector station as described above with regard to the schematic illustration in FIG. 1 will be more clearly understood upon reading the following description of FIG. 2 of the drawing. To facilitate the description, probes 46 are identified in FIG. 2 as 46L and 46R indicating their respective locations on the left and right hand sides of the drawing. With regard to FIG. 2, probes 46L and 46R, the structures of which are described in greater detail hereinafter, each comprise telescopically associated tubular housing components 60, 62 and 64, a conductor rod 66 extending axially therethrough and having a lower end rigidly interconnected with housing tube 60 such as by a contact disc 68. The upper end of housing tube 64 is rigidly attached to a support housing 70 in which actuating means 72 for the probe is disposed. Any suitable actuating mechanism may be employed including, for example, electrical, electromechanical, pneumatic, or hydraulic mechanisms. For purposes of the present description, actuating mechanism 72 is illustrated as a hydraulic unit including a cylinder 74 and a piston 76 connected to the upper end of conductor rod 66. It will be appreciated that reciprocating movement imparted to conductor rod 66 by piston 76 causes extension and retraction of the probe assembly relative to the upper surface of a bundle thereunderneath, which upper surface is represented by the numeral 78 in FIG. 2. The lower end of the probe is provided with a contact 80 reciprocable relative to housing tube 60 and thus contact disc 68. The inner end of contact 80 carries a contact plate 82 for engagement with disc 68 thus to complete a circuit through contact 80 and conductor rod 66 when the probe engages upper surface 78 of a newspaper bundle.

Cylinder 74 of the hydraulic mechanism is adapted to receive and exhaust hydraulic fluid through appropriate passageways located above and below piston 76 in a well known manner. A hydraulic control unit 84 is provided to control the opening and closing of valves or the like by which such fluid flow is controlled. More particularly, hydraulic control unit 84 is operable to control fluid flow into and out of cylinder 74 in a manner to extend the corresponding probe, lock the probe in an extended disposition, and retract the probe. These functions of hydrualic control unit 84 and control of the latter unit are fully set forth in the aforementioned U.S. Pat. No. 3,841,205.

Figure 3:
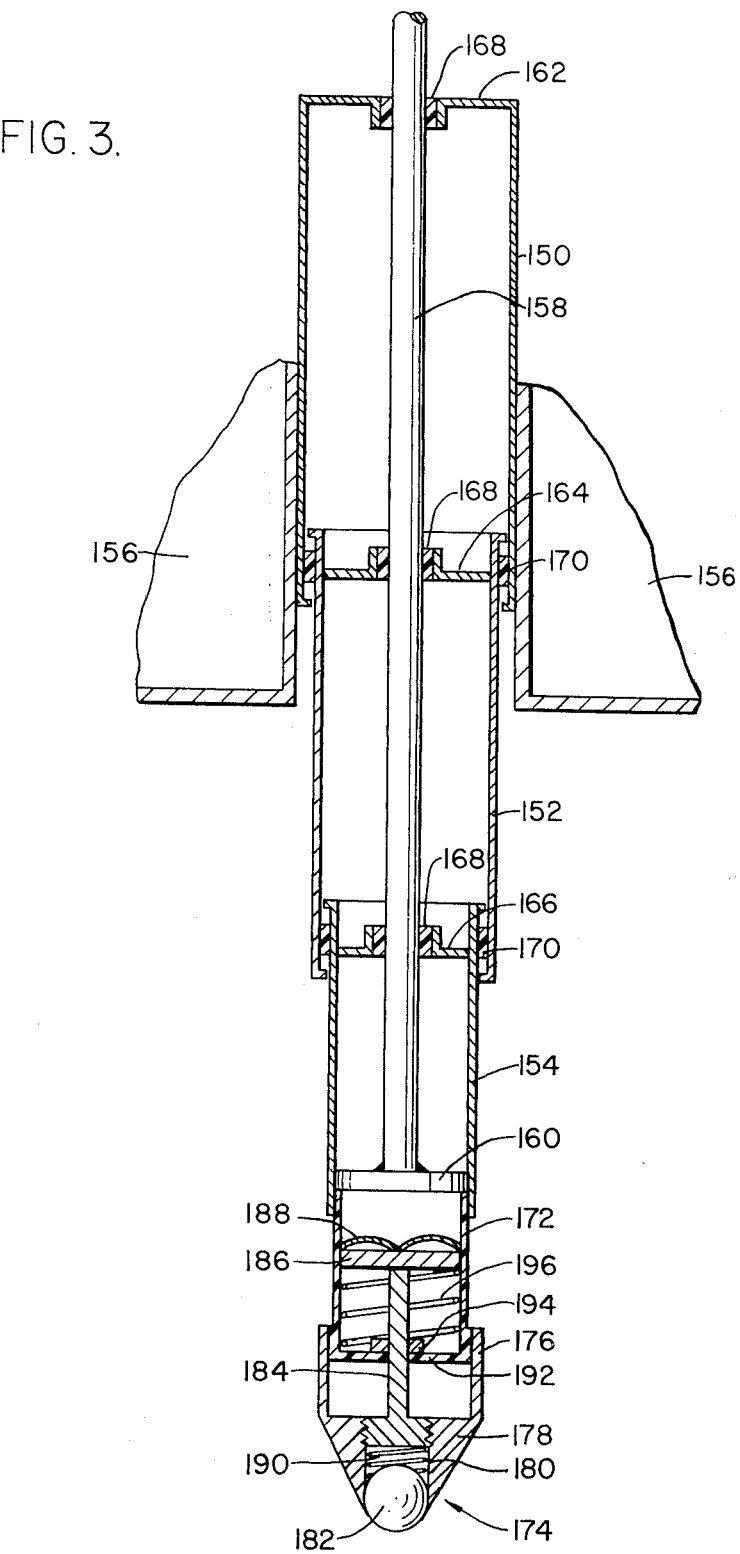
FIG. 3 is an elevation view, in section, of the article detecting probe of the present invention.

Referring now to FIG. 3, there is illustrated a preferred embodiment of the structure of the probes described hereinabove. More particularly, the probe is comprised of a tubular housing defined by three telescopically associated tubular housing components 150, 152 and 154. These components may be made of any suitable material such as metal and may be of any desired cross section and preferably are circular in cross section. Housing component 150 is fixedly secured in any suitable manner to a support component 156 disposed at the detecting station in overlying relationship with respect to the conveyor. Housing component 152 is longitudinally slideable relative to housing component 150, and housing component 154 is slideable relative to housing component 152. Metallic conductor rod 158 extends axially through the housing components, and a metallic disc 160 is connected to the lower end of rod 158 such as by welding. The peripheral edge of disc 160 is suitably interconnected with the inner surface of housing component 154 such as by welding or brazing. It will be appreciated, therefore, that reciprocating movement imparted to conductor rod 158 causes housing components 152 and 154 to reciprocate relative to one another and to housing component 150, thus to achieve extension and retraction of the probe. The upper end of conductor rod 158 can be connected to any suitable mechanism for imparting reciprocation thereto, such as the hydraulic unit illustrated in FIG. 2.

The upper ends of housing components 150, 152 and 154 are provided with apertured metal plates 162, 164 and 166, respectively, through which conductor rod 158 extends and which plates are suitably interconnected with the corresponding housing component. Sleeve 168 of electrical insulating material are disposed in the apertures of plates 162, 164 and 166 in surrounding relationship with respect to conductor rod 158, and the plates and sleeves serve to guide reciprocating movement of the conductor rod and to electrically insulate the conductor rod from the housing components if the latter are made of metal. It will be appreciated that the housing components and aperture plates could be made of nonconductive material, whereby the provision of sleeves of insulating material would not be necessary. Bearing sleeves 170 are disposed between housing components 150 and 152 and between housing components 152 and 154 to enhance the sliding engagement therebetween. Bearing sleeves 170 preferably are of electrical insulating material, especially if the housing components are produced from conductive material. The lower end of housing component 154 is provided with a sleeve 172 of electrical insulating material which extends below the lower edge of housing component 154 to support a reciprocable probe contact assembly 174. Sleeve 172 and housing component 154 can be interconnected in any suitable manner such as by the use of mechanical fasteners, threaded interengagement, or suitable bonding.

Contact assembly 174 includes a sleeve 176 of conductive material having a conical end wall 178 defining a tip for the probe. Wall 178 is provided with an opening 180 extending axially therethrough and in which a spherical ball 182 is disposed. Ball 182 is of conductive material, and the lower end of wall 178 is turned in in a well known manner to support ball 182 for rotation in opening 180. The inner end of opening 180 is threaded to receive the cooperatively threaded end of a contact finger 184 which extends axially of sleeve 176 and into insulating sleeve 172 of the housing assembly. A contact carrying plate 186 is attached to the inner end of contact finger 184 and supports an annular metal contact spring 188 which has portions of arcuate contour in cross section. Contact finger 184, plate 186 and contact spring 188, of course, are produced of conductive material.

A contact spring 190 is disposed between the lower end of contact finger 184 and ball 182 to bias ball 182 axially outwardly with respect to end wall 178. Spring 190 is of conductive material and the biasing force thereof against ball 182 is adapted to be adjusted by the threaded engagement between contact finger 184 and opening 180.

Sleeve 176 engages the outer surface of insulator sleeve 172, thus to guide reciprocating movement of contact assembly 174 relative to the probe housing. To further facilitate guidance of contact assembly 174, an apertured end plate 192 of insulating material is disposed across the lower end of sleeve 172 and is suitably interconnected therewith. It will be appreciated, however, that end wall 192 can be integral with sleeve 172. Contact finger 184 extends through the aperture in end plate 192 and is provided with a stop collar 194 which limits outward movement of contact assembly 174 relative to the probe housing. A positioning spring 196 is disposed in sleeve 172 between plate 186 and end wall 192 and is suitably interconnected therewith to bias the contact assembly toward the extended position thereof relative to end wall 192. In this respect, the spring may be suitably attached at one end to end wall 192 and at the other end to contact support plate 186 so that the spring is expanded upon movement of contact assembly 174 toward end wall 192, whereby spring 196 imposes a pulling force on the contact assembly.

When conductor rod 158 is displaced to extend the probe toward an underlying bundle of newspaper as described hereinabove, ball 182 engages the upper surface of the bundle and is stopped thereby. Ball 182 is rotatable in opening 180 and this permits the underlying bundle to move relative to the probe without the probe tearing the paper. When ball 182 engages the upper surface of the bundle and stops, further movement of conductor rod 158 to extend the probe causes insulating sleeve 172 of the housing assembly to descend relative to sleeve 176 of contact assembly 174. This eventually brings spring contact 188 into engagement with contact plate 160 on the lower end of conductor rod 157, thus to complete an electrical circuit through ball 182, spring 190, contact finger 184, contact support plate 186, contact spring 188, contact plate 160 and rod 158. When conductor rod 158 is displaced to retract the probe assembly, ball 182 remains in engagement with the underlying bundle as a result of the influence of spring 196 on the contact assembly, whereby elevation of the probe housing moves contact plate 160 out of engagement with contact spring 188, thus to break the foregoing electrical circuit.

The probe assembly described hereinabove advantageously provides for the probes at the detecting station to retract completely into the support structure therefor, thus to avoid exposure of the probes following a detecting operation. Moreover, the telescoping relationship of the probe housing provides for the probe element to be extended whatever distance is required to provide for the contact assembly at the lower end of the probe to contact a bundle and close the circuit through the conductor rod. This advantageously enables the probe to detect bundles of different thicknesses or heights relative to the conveyor surface, and provides together with the independent actuation of the two probes for the probes to sense a bundle wherein the upper surface of the bundle is slanted in a direction which requires the probes to extend to different lengths to engage the bundle.

It is to be distinctly understood that the foregoing descriptive matter is to be interpreted as merely illustrative of the present invention and not as a limitation.

Having thus described my invention, I claim:

1. An extendable and retractable probe comprising a tubular housing having first and second ends, a reciprocable conductor rod extending coaxially into said housing through said first end and having a contact end within said housing and adjacent said second end, means interconnecting said housing and rod against relative axial displacement therebetween, a sleeve telescopically interengaged with said second end of said housing for axial reciprocation relative thereto between extended and retracted positions, said sleeve having an outer end spaced from said second end of said housing, a spherical contact ball, said outer end of said sleeve including means supporting said ball for rotation relative thereto and reciprocating movement therewith, a contact element disposed within said housing between said contact end of said rod and said second end of said housing, means electrically interconnecting said ball and said contact element including means interconnecting said contact element with said sleeve for reciprocation therewith, said contact element engaging said contact end of said rod when said sleeve is in said retracted position thereof and being axially spaced from said contact end when said sleeve is in said extended position, said sleeve being freely reciprocable relative to said housing, and spring means biasing said sleeve toward said extended position.

2. The probe according to claim 1, and at least one second tubular housing telescopically associated with the first named housing and supportable in a fixed position, said first named housing and said conductor rod being reciprocable relative to said second housing, whereby reciprocation of said rod reciprocates said first named housing relative to said second housing.

3. The probe according to claim 1, wherein said spring means biasing said sleeve toward said extended position is disposed between said second end of said tubular housing and said contact element.

4. The probe according to claim 1, wherein said second end of said tubular housing has an apertured end wall, said means interconnecting said contact element and said sleeve including a contact finger extending through the aperture in said end wall and having outer and inner ends with respect to said end wall, said outer end of said finger being connected to said sleeve, a contact element supporting plate on the inner end of said finger, said biasing spring means being disposed between said end wall and said supporting plate and having opposite ends connected one with said end wall and the other with said supporting plate, and stop means on said contact finger engaging said end wall when said sleeve is in said extended position.

5. The probe according to claim 4, wherein said means supporting said spherical ball includes an aperture extending axially through said outer end of said sleeve and receiving said ball, said outer end of said contact finger and said sleeve aperture being threadedly interengaged for said finger to be axially adjustable relative to said sleeve, and a biasing spring in said aperture between said outer end of said finger and said spherical ball.

6. The probe according to claim 5, and at least one second tubular housing telescopically associated with the first named housing and supportable in a fixed position, said first named housing and said conductor rod being reciprocable relative to said second housing, whereby reciprocation of said rod reciprocates said first named housing relative to said second housing.

* * * * *